SOLID-STATE D-C TO A-C CONVERTER

Filed Jan. 10, 1967

April 1, 1969 P. V. CASTIGLIONE 3,436,643

SOLID-STATE D-C TO A-C CONVERTER

Filed Jan. 10, 1967

Sheet 2 of 2

United States Patent Office 3,436,643
Patented Apr. 1, 1969

3,436,643

SOLID-STATE D-C TO A-C CONVERTER

Paul V. Castiglione, Endicott, N.Y., assignor to General Electric Company, a corporation of New York Filed Jan. 10, 1967, Ser. No. 608,391
Int. Cl. H02m *1/12, 7/44, 7/68*
U.S. Cl. 321—9 2 Claims

ABSTRACT OF THE DISCLOSURE

A reference A-C signal drives a pulse-width modulator which generates sinusoidally modulated pulse-width signals. These signals sample the D-C input. Output filtering produces the desired A-C signal at the reference frequency and with an amplitude proportional to the D-C input.

Background of the invention

In a great many control systems, both A-C and D-C signals are present because certain components require or generate signals in these forms. For example, measuring instruments generally generate D-C signals and many devices such as motors and synchros require A-C signals. As a result, D-C to A-C conversion is a general purpose analog function. Probably the most satisfactory of prior conversion circuits have been based on the use of magnetic transformers. Such circuits are satisfactory when suitably augmented by auxiliary circuits for providing gain, impedance, matching, etc. in accordance with the particular application. However, for precision operation, high reliability, etc., there are severe demands on the magnetic components which are difficult to satisfy and accordingly result in very expensive devices.

Probably the most significant problem with magnetic components is that they are incompatible with semiconductor fabrication processes. That is, it is not practical to manufacture circuits with both semiconductor and magnetic material components as unitary structures. Also, the use of magnetic components limits the density of packaging.

Because of the inherent impedance characteristics of magnetic components, most applications of D-C to A-C converters require impedance matching where the utilization circuits are semiconductor circuits. Also, because of the scale factors of utilization devices and/or because there can be a plurality of such devices in parallel, additional devices giving substantial gain for signal level matching or satisfactory "fan-out" can be required.

Field of the invention

This invention relates to electronic circuits using semiconductor devices for converting variable electrical D-C signals to A-C signals having an amplitude proportional to the input D-C signals. It is intended primarily for use in analog control systems such as flight control systems and analogous applications.

Summary of the invention

Accordingly, it is an object of the invention to provide a D-C to A-C converter which is compatible with integrated semiconductor circuits and does not require magnetic components.

It is a further object of the invention to provide a D-C to A-C converter which does not require a complex filter.

It is an additional object of the invention to provide a D-C to A-C converter which has gain, linearity, harmonic distortion components, null stability and frequency response range compatible with state-of-the-art integrated circuits.

Brief description of the drawing

The invention, together with further objects and advantages thereof, may best be understood by referring to the following description taken in conjunction with the appended drawings in which like numerals indicate like parts and in which.

Description of the preferred embodiments

Figure 1:
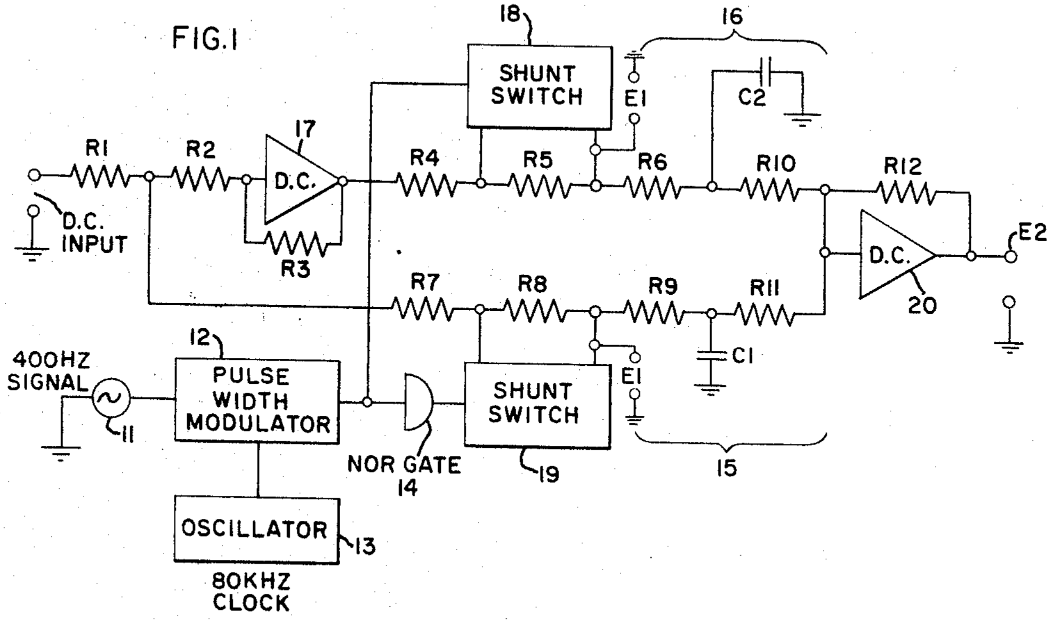
FIGURE 1 is a schematic diagram of a first embodiment of the invention.
Figure 2:
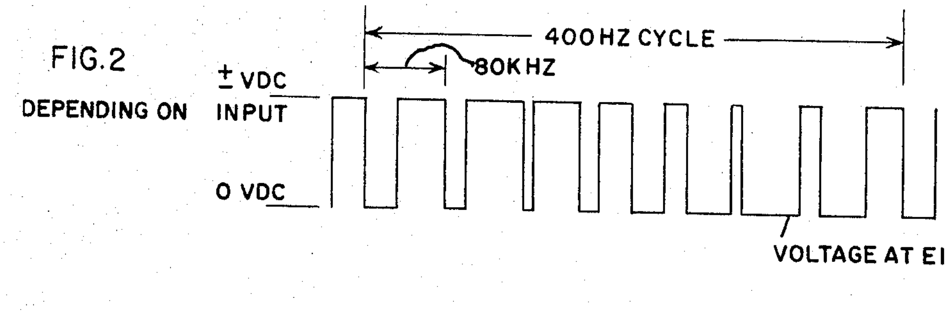
FIGURES 2 and 3 are waveform diagrams illustrating operation of the FIGURE 1 circuit.

In the first embodiment, an A-C reference signal source 11, such as a standard 400 Hz. power supply, provides a sinusoidal signal at the desired output A-C frequency. This signal is converted into pulse-width form by a pulse-width modulator 12, such as described in Electronics, Oct. 11, 1963, "Pulse-Width Modulator," by H. Schmid and B. D. Grindle. An 80 kHz. oscillator 13 determines the sampling frequency of pulse-width modulator 12. The output of the modulator consists of rectangular pulses in which a zero D-C voltage level and a switching D-C voltage level alternate. The scale factor is adjusted so that the average duty cycle over a 400 Hz. cycle is 50%. The resulting waveform of the pulse-width modulator 12 output is shown in FIGURE 2.

Figure 3:
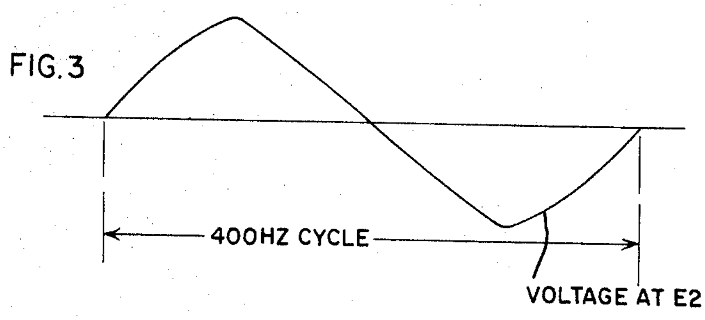

The D-C input signal is applied to input resistor R1. One part of the signal is directed to filter 15 and the other part to filter 16 after polarity inversion by reversing amplifier 17. A conventional D-C operational amplifier with a feedback resistor R3 and equal input resistor R2 provides a satisfactory polarity reversal. The signals applied to filters 15 and 16 are sampled or modulated by shunt switches 18 and 19. Because of the nonideal characteristics of analog switches, resistors R4, R5 and R7, R8 enable satisfactory approximation of open-circuit and closed-circuit conditions in the conventional manner. Simple "T" filters are used, consisting of resistors R6, R10, R9, R11 and capacitors C1, C2 to convert the rectangular pulse trains to sinusoidal form. Because the conventional "NOR" gate 14 inverts the switching signals from modulator 12 applied to shunt switch 19, making them complementary to the switching signals applied to switch 18, the filtered sampled signals are in phase. The resulting sinusoidal signals are of equal amplitude and have D-C components of equal amplitude and opposite polarity. These signals are added by applying them directly to input resistors R10 and R11 of output amplifier 20 and their D-C components are cancelled. By selecting the value of the feedback resistor R12, the gain provided by the D-C operational amplifier 20 is adjusted. The resulting output A-C waveform is shown in FIGURE 3.

It has been found that the carrier frequency component of the signals applied to the filters is readily removed and the harmonics of 400 Hz. are readily made negligible for general control system requirements. For especially stringent low harmonic content requirements, conventional filtering refinements work very well.

The balanced arrangement of the first embodiment, using a reversed polarity component of the input D-C signals, removes the need for a series coupling capacitor for D-C removal. This substantially increases the frequency response or bandwidth of the converter.

It should be noted that this converter can also incorporate a multiplication function. One way in which this is implemented is to vary the amplitude of the 400 Hz. supply applied to modulator 12.

Figure 4:
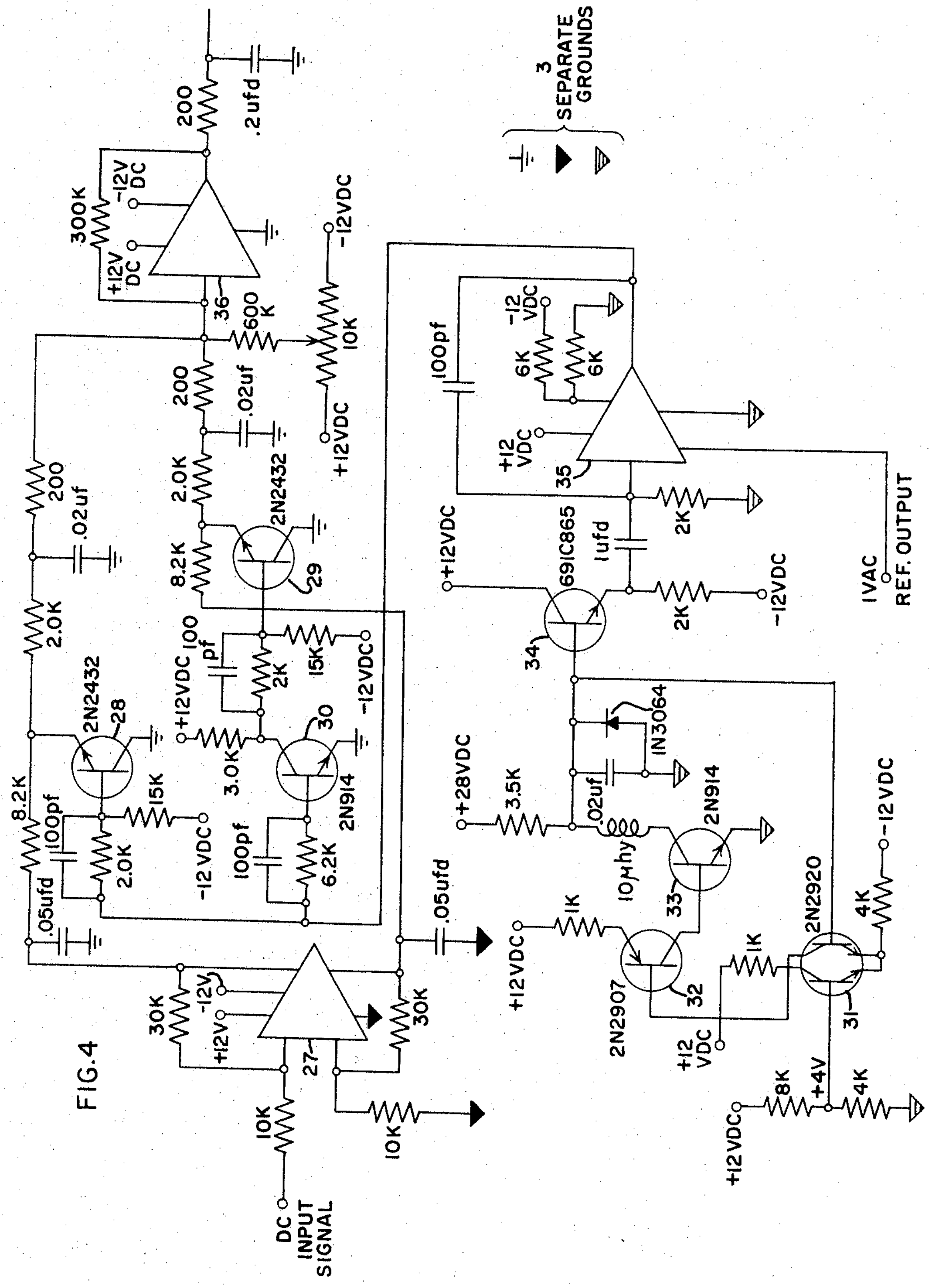
FIGURE 4 is a schematic diagram of a preferred embodiment of the invention.

A preferred embodiment of the invention is shown in FIGURE 4. The modulator in this form makes extensive use of integrated circuits. In particular, a dual output operational amplifier type integrated circuit 27 produces balanced bipolarity signals proportional to the variable level input D-C signal. In addition to providing relaxed specifications on the input signals, a more symmetrical circuit results in respect to the positive and negative branches, providing better signal matching and switching. Transistors 28, 29 and 30 provide shunt switching for the positive and negative branches. The ON-OFF conditions of these switches are controlled by integrated circuit 35. This amplifier, in response to a system A-C reference signal and the oscillator signals produced by transistors 31–34, provide the pulse-width modulated signals of the form shown in FIGURE 2 for the switching transistors. In effect, the amplifier 35 produces high frequency switching pulses which are expanded and contracted, sinusoidally, over the reference frequency cycle.

While particular embodiments of the invention have been shown and described herein, it is not intended that the invention be limited to such disclosure, but that changes and modifications can be made and incorporated within the scope of the claims.

What is claimed is:

1. A solid state D-C to A-C signal converter consisting of:

(a) a source of pulse-width signals responsive to an A-C input signal having the frequency desired for an output and also responsive to a clock frequency several times the frequency of said A-C input signal;

(b) said source of pulse-width signals having a cyclic variation in pulse-width so that the pulse durations vary sinusoidally at the said frequency desired;

(c) a shunt switch coupled directly to a D-C source and being responsive to D-C signals from said D-C source and to said source of pulse-width signals for producing a signal proportional to both said D-C signals and to the pulse-width signals;

(d) an R-C filter connected directly to said shunt switch for filtering out said clock frequency to produce an A-C output signal at said frequency desired and whose magnitude is directly proportional to said A-C input signal and to said D-C signals.

2. A D-C to A-C converter comprising:

(a) a source of constant amplitude sinusoidal signals at the desired A-C output frequency;

(b) a pulse-width modulator responsive to said constant amplitude signals for generating switching signals which are sinusoidally pulse-width modulated;

(c) a source of clock signals, having a frequency at least ten times said constant amplitude signal frequency for energizing said pulse-width modulator;

(d) a reversing amplifier responsive to said input D-C signals for providing a parallel signal of reverse polarity;

(e) a pair of filter circuits for converting applied pulse-width signals to a sinusoidal waveform;

(f) switching means, responsive to said pulse-width switching signals, for sampling said input D-C signals and said parallel signal of reverse polarity to respective said filter circuits;

(g) a D-C operational amplifier, coupled to said filter circuits, for providing the desired A-C output signal.

References Cited

UNITED STATES PATENTS

| | | | |
|---|---|---|---|
| 3,324,376 | 6/1967 | Hunt | 321—9 |
| 3,334,292 | 8/1967 | King et al. | 321—45 |
| 3,376,490 | 4/1968 | Osugi | 321—9 X |

JOHN F. COUCH, *Primary Examiner.*

W. H. BEHA, Jr., *Assistant Examiner.*

U.S. Cl. X.R.

321—44; 328—151